(12) United States Patent
Shah et al.

(10) Patent No.: US 9,891,064 B2
(45) Date of Patent: Feb. 13, 2018

(54) SELECTION OF A ROUTE BASED ON PRIOR USER BEHAVIOR OR COMMERCIAL INTERESTS

(71) Applicant: Aruba Networks Inc., Sunnyvale, CA (US)

(72) Inventors: Varun Shah, Sunnyvale, CA (US); Kiyo Kubo, Sunnyvale, CA (US); Nicholas Farina, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/170,533

(22) Filed: Jan. 31, 2014

(65) Prior Publication Data

US 2015/0219466 A1  Aug. 6, 2015

(51) Int. Cl.
   *G06F 19/00*  (2011.01)
   *G01C 21/34*  (2006.01)
   *G06Q 30/02*  (2012.01)

(52) U.S. Cl.
   CPC ..... *G01C 21/3484* (2013.01); *G06Q 30/0205* (2013.01)

(58) Field of Classification Search
   CPC ........ G01C 21/34; G01C 21/00; G01C 21/26; G01C 21/36; G01C 21/3484; G01C 21/3476; G01C 21/3679; G01C 21/20; G01C 21/343; G01C 21/3644; G06Q 30/0639; G06Q 30/0633
   USPC ..... 701/465, 400, 538, 537, 410; 455/550.1, 455/556
   See application file for complete search history.

(56) References Cited

U.S. PATENT DOCUMENTS

| | | | | |
|---|---|---|---|---|
| 8,073,460 | B1* | 12/2011 | Scofield | G06Q 30/02 |
| | | | | 455/414.1 |
| 8,583,684 | B1* | 11/2013 | Kirmse | G06F 17/30241 |
| | | | | 707/770 |
| 8,706,406 | B2* | 4/2014 | Kalaboukis | H04W 4/02 |
| | | | | 701/423 |
| 9,036,509 | B1* | 5/2015 | Addepalli | H04W 4/046 |
| | | | | 370/259 |
| 9,122,250 | B2* | 9/2015 | Hoffman | G04F 10/00 |
| 9,165,304 | B2* | 10/2015 | Weiss | G06Q 10/00 |
| 9,219,788 | B1* | 12/2015 | Buron | H04L 67/18 |
| 9,324,091 | B2* | 4/2016 | Randell | H04W 4/206 |
| 9,355,391 | B2* | 5/2016 | von Behren | G06Q 20/10 |
| 2008/0176583 | A1* | 7/2008 | Brachet et al. | 455/456.3 |
| 2009/0227280 | A1* | 9/2009 | Raab | 455/550.1 |
| 2009/0228196 | A1* | 9/2009 | Raab | 701/200 |
| 2011/0270517 | A1* | 11/2011 | Benedetti | G01C 21/20 |
| | | | | 701/533 |
| 2012/0143504 | A1* | 6/2012 | Kalai et al. | 701/533 |
| 2012/0310736 | A1* | 12/2012 | Vengroff | G06Q 30/02 |
| | | | | 705/14.53 |

(Continued)

*Primary Examiner* — Ronnie Mancho
(74) *Attorney, Agent, or Firm* — Hewlett Packard Enterprise Patent Department

(57) ABSTRACT

A non-transitory computer readable medium comprises instructions which cause performance of receiving a request from a user for directions to a destination, determining, based on historical user data, a commercial interest of the user, selecting a route based at least on a location related to the commercial interest being on the route, and directing the user to the destination according to the route.

20 Claims, 3 Drawing Sheets

(56) References Cited

U.S. PATENT DOCUMENTS

| | | | |
|---|---|---|---|
| 2013/0282520 A1* | 10/2013 | Tapley | G06Q 30/0641 |
| | | | 705/26.8 |
| 2013/0290234 A1* | 10/2013 | Harris | G06N 5/022 |
| | | | 706/46 |
| 2013/0345961 A1* | 12/2013 | Leader et al. | 701/410 |
| 2014/0257989 A1* | 9/2014 | Prakah-Asante | G01C 21/3484 |
| | | | 705/14.63 |
| 2014/0278070 A1* | 9/2014 | McGavran et al. | 701/465 |
| 2014/0278941 A1* | 9/2014 | Livingston | G06Q 30/02 |
| | | | 705/14.45 |
| 2015/0106011 A1* | 4/2015 | Nesbitt | G01C 21/3476 |
| | | | 701/412 |

* cited by examiner

SELECTION OF A ROUTE BASED ON PRIOR USER BEHAVIOR OR COMMERCIAL INTERESTS

BACKGROUND

Navigation, and providing instructions for individuals to reach a desired destination is a large and expanding field. Virtually every new car, and most new mobile devices, is equipped with the ability to provide navigation instructions. New and better ways to determine which route is "best" are always needed.

OVERVIEW

In general, embodiments relate to a non-transitory computer readable medium comprising instructions which, when executed by one or more processors, cause performance of operations comprising: receiving a request from a user for directions to a destination; determining, based on historical user data, a commercial interest of the user; selecting a first route, of a plurality of routes, based at least on a location related to the commercial interest being on the first route; and directing the user to the destination according to a first route.

In general, embodiments relate to a system. The system comprises at least one network device including a hardware processor; the system being configured to perform operations comprising: receiving a request from a user for directions to a destination; determining, based on historical user data, a commercial interest of the user; selecting a first route, of a plurality of routes, based at least on a location related to the commercial interest being on the first route; and directing the user to the destination according to a first route.

In general, embodiments relate to a method. The method comprises receiving a request from a user for directions to a destination; determining, based on historical user data, a commercial interest of the user; selecting a first route, of a plurality of routes, based at least on a location related to the commercial interest being on the first route; and directing the user to the destination according to a first route, wherein the method is performed by at least one device including a hardware processor.

Other aspects and advantages will be apparent from the following description and the appended claims.

DETAILED DESCRIPTION

Figure 1:
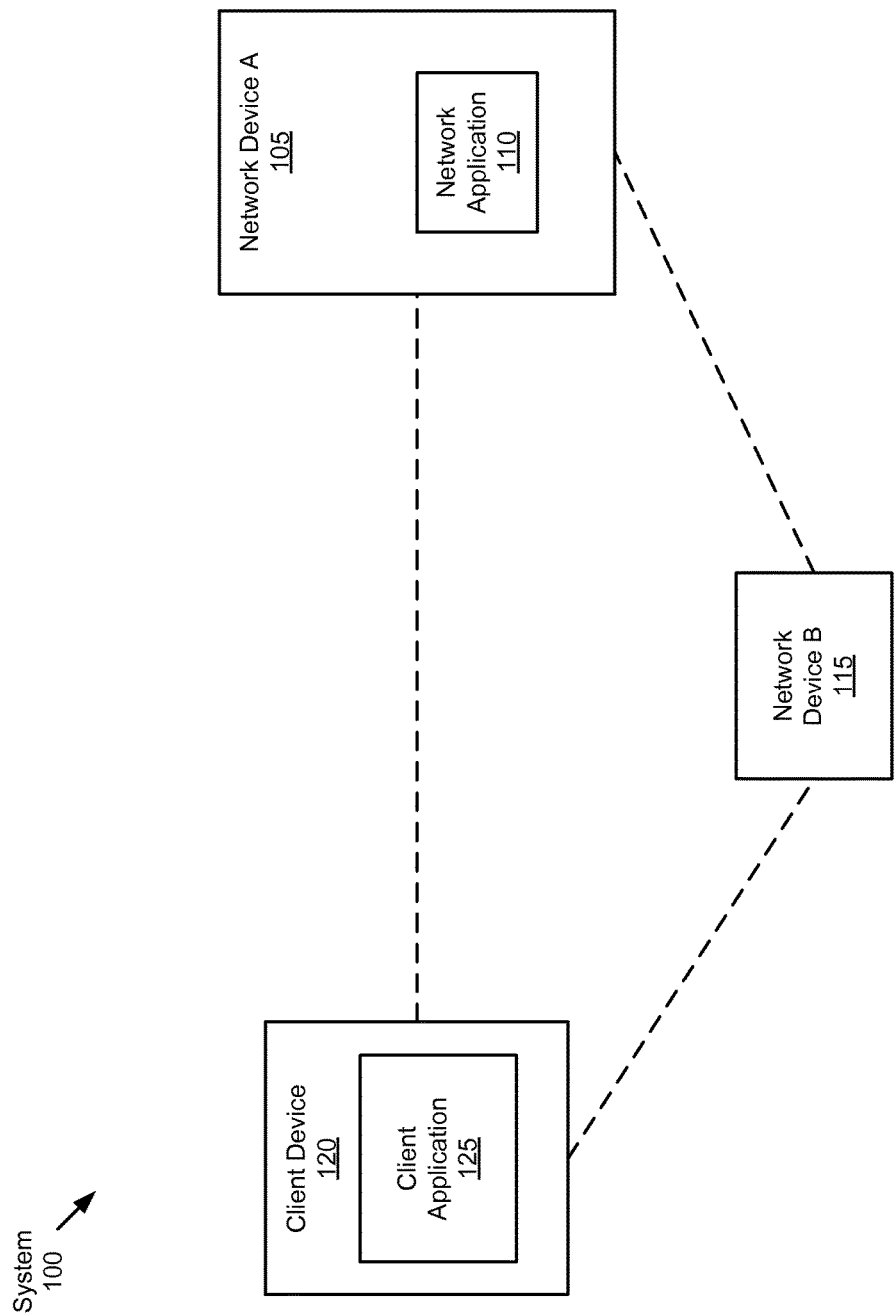
FIG. 1 shows a schematic diagram in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a computer readable medium, a method, and a system for selecting a route based on prior user behavior or commercial interests. In general, historical data is gathered for a user. Commercial interests of the user may then be determined based on the historical data. A request is received from a user to be navigated to a destination. Subsequently, potential routes are generated to navigate the user to the destination, and the routes are ranked based on a variety of factors. The user is then navigated to his or her destination based on the route with the highest ranking.

Commercial Interest

In one or more embodiments, one factor in determining which route to send a user on is whether the route passes by a "commercial interest" of the user. A "commercial interest" may be any product(s) or service(s) that a user can purchase. Specifically, the "commercial interest" of a given user may be determined based on historical data, and may relate to the interests, hobbies, or other aspects of the user. Commercial interest may be related to individual items (e.g., tennis rackets, tennis shoes, etc), categories of items (e.g., electronics, books, etc.), stores, and or any other suitable granularity and/or scope. Commercial interests may be directly related to historical data of a user (i.e., a user likes cell phones, thus a commercial interest is stores that sell cell phones, etc), or may be indirectly related or inferred from the historical data (i.e., historical data shows a user likes to hike, thus sports stores and/or boots may be a commercial interest, etc). Commercial interests may or may not be constant—they may change based on time of day, week, month, seasons, life events, or any other suitable standard. In particular, commercial interest may be used to prioritize routes to destinations that pass by stores, vendors, or other places that match a user's commercial interest(s). Additional examples of commercial interests and the use of commercial interests in ranking routes are discussed below.

FIG. 1 shows a system (100) in accordance with one or more embodiments. As shown in FIG. 1, the system (100) has multiple components, including one or more network devices (e.g., network device A (105) and network device B (115)), and client device (120). A network application (110) is executing on network device A (105) and a client application (125) is executing on the client device (120).

In one or more embodiments, each network device (105, 115) is a hardware device that is configured to receive packets (e.g., unicast packets, multicast packets) and transmit the packets to the client device(s) connected to the network device. A network device might also be configured to receive packets from a client device and transmit the packet to other network devices. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or microcores of a processor.

By way of an example, a client device may be directly wired or wirelessly communicatively connected to an access point, which is directly communicatively connected to a controller, which is connected to a network (not shown). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). In one or more embodiments, the network(s) may be password protected, or secured in any other suitable manner. Access points may be directly connected to the one or more networks or connected via a controller. In other words, an access point may be directly connected to a particular controller. An access point may include a wireless access point (WAP) that communicates wirelessly with devices using Wi-Fi, Bluetooth or related standards and that communicates with a wired network.

The network application (110) includes functionality for gathering historical user data, determining commercial interests of a user, identifying the physical location of client devices (e.g., client device (120)), generating routes, ranking routes, sending a user navigation instructions and other functionalities as needed for implementing the embodiments. In one or more embodiments, network application (110) may work in conjunction with the various network devices (e.g., network device A (105) and network device B (115)) to identify the physical location of client devices. Alternatively or additionally, a single network device may identify the location of client devices. Specifically, Wi-Fi may be used to identify the physical location of client devices using any suitable method, such as Wi-Fi triangulation, or other technology. In Wi-Fi triangulation, the strength of the signal(s) received by various network devices is measured. Through the relative strengths of the signals, and the known locations of the network devices, the location of client device can be determined with very high accuracy. It will be apparent to one of ordinary skill in the art that there are many ways to identify location using Wi-Fi and, as such, the embodiments should not be limited to the above examples.

The use of Wi-Fi for identifying the locations of client devices has many advantages. First, no additional software is needed for the vast majority of client devices—whether the client device is a mobile phone, laptop, netbook, smartwatch, smartglasses, or other device, most modern devices include functionality to send and receive Wi-Fi signals. This base functionality is sufficient to identify the location of the associated device using Wi-Fi based methods. Further, Wi-Fi based location identification is able to track many different client devices simultaneously.

Additionally, in one or more embodiments of the invention, the Global Positioning System (GPS) may be used to identify the locations of client devices and for any other location based data needed by the embodiments. GPS is a space-based satellite navigation system. Many modern devices are equipped with GPS receivers, which enable the devices to receive signals from multiple GPS satellites at the same time, and use the information in the signals to determine their exact location on earth. Similarly, many other standards used for determining location may be used for the purposes of the invention and, as such, the invention should not be limited to the above examples.

In one or more embodiments, network application (110) includes functionality for gathering historical data about a user and determining commercial interests of the user based on the historical data. The historical data may be gathered in a variety of ways, and from a variety of sources. In one or more embodiments, the location of a user may be tracked, and inferences may be made about the user's interests based on how long the user spends at various locations. For example, if a user spends a long time in a coffee shop, it may be inferred that the user likes coffee. Likewise, if a user spends a long time in a bookstore, a commercial interest of the user may be determined to be books and/or reading. In one or more embodiments, the historical data may include purchase history or transactional data. For example, when users order items the purchase data may be collected, and inferences may be made based on what items the user bought. In one or more embodiments, the historical data may include answers to questionnaires filled out by the user, or may include profiling data from a third party source. Additionally, the historical data may come from any other suitable source or party. In one or more embodiments, the historical data may be collected over any time period, from minutes to years. Further, the commercial interests of the user may be short-term (e.g., restaurants are a commercial interest when the user may currently be hungry) or long-term (e.g., hobbies). It will be apparent to one of ordinary skill in the art that there are many different kinds of historical data that may be collected and many different kinds of commercial interests and, as such, embodiments should not be limited to the above examples.

In one or more embodiments, network application (110) includes functionality for generating routes and navigating a user to a destination. Network application (110) may have access to a layout of the public area, building, or other area in which a user may be located. For example, the layout may be preloaded or stored in a local database, or may be accessed from an online website, the cloud, or any other suitable source. The layout may identify the available paths (e.g., roads, hallways, rooms, tunnels, etc.) which a user may take to arrive at a specified location. Network application (110) may use the layout to determine the shortest, fastest, easiest, or any other route by which to guide a user to their desired location. In one or more embodiments, routes may be generated in any manner now known or later developed. Any number of routes may be generated, from one to thirty or more. Once network application (110) has generated the routes/steps to guide a user to their destination, the steps may be sent to the user's client device in any manner now known or later developed.

In one or more embodiments, network application (110) includes functionality to rank routes, so that the most relevant route is selected from all generated routes. The routes may be ranked using any method now known or later developed. The routes may be ranked based on a variety of factors including, but not limited to: distance, expected duration/arrival time, locations along the route (i.e., businesses or locations relevant to the commercial interests of the user), traffic, construction, accessibility, safety, cost, time of day, and/or any other factors. Each factor considered in the ranking of routes may have a weight associated with it. Each of these weights may be individually adjustable by the user, manufacturer, entity that controls and/or deploys the WiFi system, and/or any other suitable party. These weights enable the different factors to have larger or smaller impacts on the overall ranking. It will be apparent to one of ordinary skill in the art that there are many factors that may be considered and many ways to rank routes and, as such, embodiments should not be limited to the above examples.

In one or more embodiments, client device (120) may be a computing system capable of wirelessly sending and/or receiving information. For example, client device (120) may be a laptop computer, smartphone, cell phone, personal digital assistant, tablet computer, handheld video game system, or other mobile device.

In one or more embodiments, client application (125) is a software application executing on client device (120) that includes the functionality needed for interaction with the network devices. Client application (125) may be installed by the user of client device (120) or may come pre-installed by the manufacturer. In one or more embodiments, client application (125) is part of the operating system, or other standard pre-installed software, of client device (120), as the embodiments may be practiced without the installation of specialized software on client devices. In one or more embodiments, client device (120) may not have client application (125) installed. Alternatively, in one or more embodiments, client application (125) may include all, or a subset, of the functionality described above for network application (110).

Figure 2:
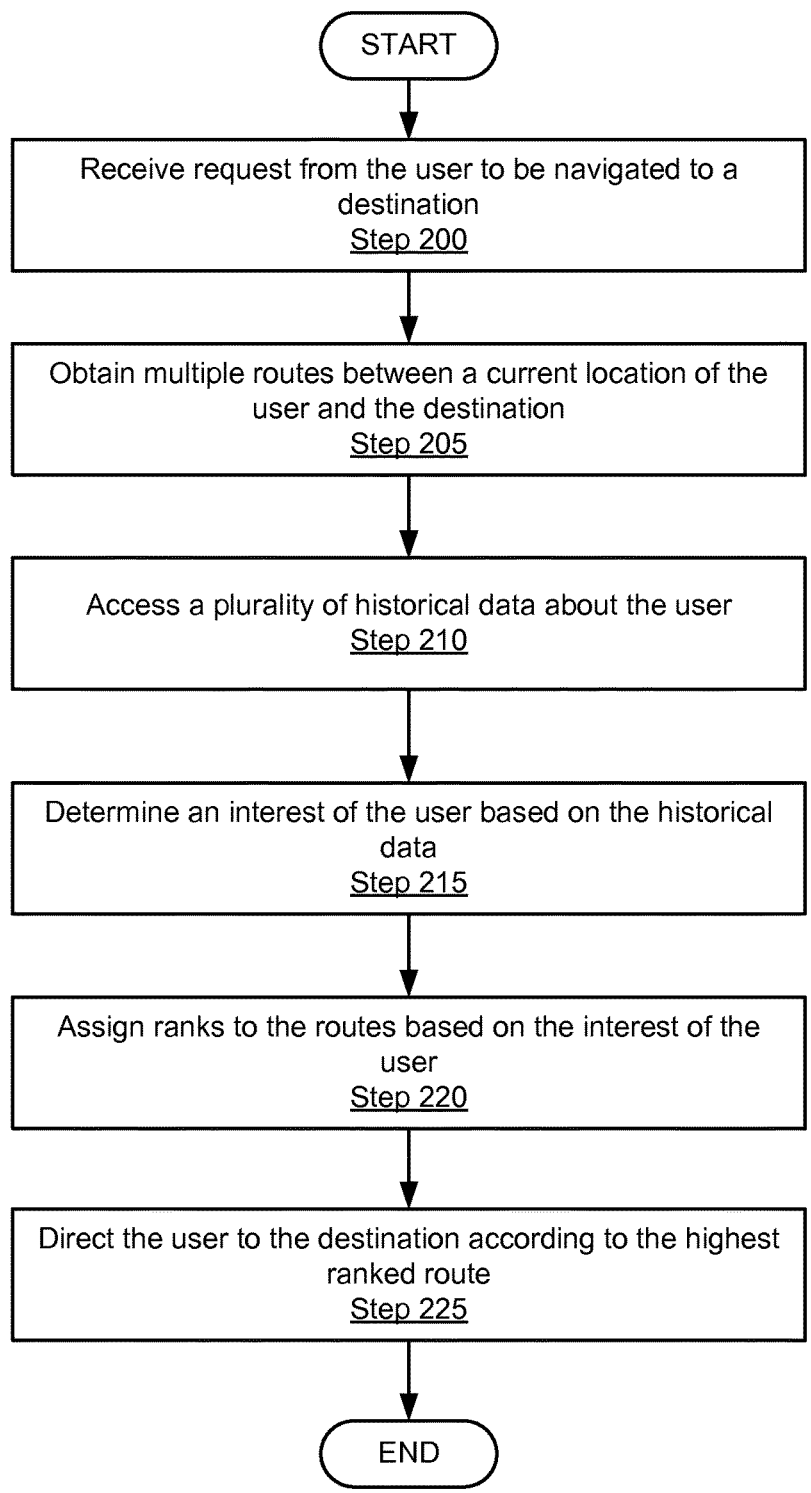
FIG. 2 shows a flowchart of a method in accordance with one or more embodiments.

FIG. 2 shows a flowchart of a method for selecting a route. While the various steps in this flowchart are presented and described sequentially, one of ordinary skill in the art will appreciate that some or all of the steps may be executed in different orders and some or all of the steps may be executed in parallel. Further, in one or more embodiments, one or more of the steps described below may be omitted, repeated, and/or performed in a different order. Accordingly, the specific arrangement of steps shown in FIG. 2 should not be construed as limiting the scope of the embodiments.

In Step 200, a request to be navigated to a destination is received from the user, in accordance with one or more embodiments. The request may be received in any manner now known or later developed. The destination may be any suitable destination and may be identified in any manner. For example, if the destination is a store in a mall, then the destination may be identified by the name of the store, the type of store, the number of the store, address of the store, or any other suitable metric. In one or more embodiments, the request includes the GPS coordinates of the destination or information necessary to obtain/access/lookup the GPS coordinates of the destination.

In one or more embodiments, the request may be received at a network device, or an application executing on a network device. Alternatively, the request may be received at an application executing on a client device of the user. For example, the request may be received on a client device, with the user interacting with an application. The user may indicate to the application that he or she wishes to receive directions to the library.

In Step 205, multiple routes between the current location of the user and the destination are obtained. The routes may be generated in any manner now known or later developed. The routes may be generated by a network device connected to the client device and/or by the client device itself. Any number of routes may be generated, such as 1, 2, 3, 10, or more. The user's current location may be determined by WiFi, or any other suitable manner. In one or more embodiments, the routes generated are aware of available roads, hallways, paths, and other means which the user may take to arrive at their intended destination.

In Step 210, historical data about the user is accessed, in accordance with one or more embodiments. The historical data may be gathered in many different ways including, but not limited to: tracking user location(s) and time spent at the location(s), purchase histories, questionnaires, profiling, social networking sites where the user has a profile, and/or any other source. The historical data may be gathered over any amount of time, from just the preceding seconds, previous couple hours, to years prior. In one or more embodiments, the historical data may come from more than one source. In one or more embodiments, historical data for a group of people may be linked to a single user. For example, if a couple shares a smartphone, the couple may be treated as one person for the purposes of gathering data. Alternatively, one user may be tracked as multiple people if, for example, the user has multiple different smartphones. The historical data may be accessed by a network device connected to the client device and/or by the client device itself.

In Step 215, commercial interests of the user are determined using the historical data, in accordance with one or more embodiments. The commercial interests may be determined in any manner now known or later developed. The commercial interests may be determined based off of the collected historical data of the user. For example, if a user spends lots of time in a book store, a commercial interest of the user may be books, reading, current events, and/or any other interest that may be related to spending time in a bookstore. In one or more embodiments, the commercial interests of the user may be subdivided into, for example, long-term and short-term interests. An example of a long-term interest may be a hobby of the user, such as surfing, while a short-term interest may be hunger (based on time of day, for example). It will be apparent to one of ordinary skill in the art that there are many ways to determine commercial interests and that a user may have any amount of commercial interests and, as such, embodiments should not be limited to the above examples. The commercial interests may be determined by a network device connected to the client device and/or by the client device itself.

In Step 220, the routes are ranked, in accordance with one or more embodiments. The routes may be ranked based on any number of factors. The factors which may be considered include, but are not limited to: distance, expected arrival time, businesses/vendors/shops/etc. along the route, the commercial interests of the user, time of day, user's (recent) purchase history, traffic, events, accessibility, and/or any other suitable factor. Each of the various factors for consideration may be weighted. The weighting may be set by the user(s), owners of the WiFi network, manufacturers, and/or any other suitable person or entity. The routes may be ranked by a network device connected to the client device and/or by the client device itself.

In Step 225, the user is directed to the destination according to the highest ranked route. The user may be directed in any manner now known or later developed. For example, a series of step by step instructions may be provided (e.g., turn left in 50 feet), a map may be shown with the user's current location and the destination shown, audio may be used, and/or any other suitable method. Specifically, the user will be directed to his or her intended destination and will pass by location(s) of commercial interest to the user, based on their past actions.

In an embodiment, ranking of various routes may be skipped. For example, a first identified route, from a set of applicable routes in a mall, which includes a store determined to be commercial interest to a user is selected.

In an embodiment, while a user is being routed on a particular route, a commercial interest of the user is identified. For example, while the user is walking along the particular route, the user stops in front of a shoe store for teens. One or more network devices determine that the user's cell phone has stopped moving and is located in front of a window displaying boots typically advertised to or worn by teens. Based on the pause (e.g., user window shopping), a determination is made that the user is interested in purchasing boots. As a result of the pause in front of the store that was indicative of a commercial interest, the system then modifies the particular route to route the user past additional stores that sell boots (or shoes for teens).

The following section describes various examples. The examples are included to aid in the understanding of the embodiments and are not intended to limit the scope of the embodiments.

As a first example, a user is visiting a mall near their home. The user has been to the mall many times before. The mall has free public WiFi to which the user's smartphone automatically connects. During each of the user's prior visits to the mall, the location of the user, and the duration of time the user spent in each store was tracked via the WiFi. The money spent by the user at each store may also be accessed from the financial records of the user. Thus, historical data was collected about the user, and may be used to determine the commercial interests of the user, based on which stores the user spent the most amount of time and/or money in. In this example, the user spent the most time or money in electronics stores, and therefore a commercial interest of the user is determined to be electronics. However, on this particular trip, the user is trying to buy a gift for his mother, and sends a request to be navigated to a kitchen store in the mall.

Various routes are generated to direct the user to the kitchen store: Route1 will take 3 minutes and passes the food court; Route2 will take 4 minutes and passes a new electronics store; and Route3 will take 5 minutes and passes a clothing store. The three routes are ranked based on a variety of factors, such as total distance, estimated arrival time, and/or any other suitable factors. Based on these simple parameters, the three routes are nearly identical. However, when commercial interest (electronics) is considered, Route2 receives a much higher ranking, as Route2 is the only route that would take the user by a store relevant to his commercial interests. Thus, Route2 receives the highest ranking, and is selected for navigating the user to the kitchen store. As the user is following the instructions for reaching the kitchen store, he passes the new electronics store and is so excited to see a new electronics store that he rushes in to see what the store is selling.

As a second example, a user is in a casino that has free WiFi for guests. The user has a smartphone, which is connected to the free WiFi. Thus, the user is tracked while he is sitting in the bar at the casino, drinking. After spending five hours in the bar, the user sends a request to be navigated to the pool. Based on spending five hours in the bar, a commercial interest of the user is determined to be food—so that the user may possibly sober up a bit. In response to the user's request, routes are generated: Route1 takes the user by the shops on the way to the pool, while Route2 takes the user by the food court on the way to the pool. Thus, when the two routes are ranked, Route2 is determined to be the highest ranking route because it takes the user past the food court. Thus, the user is directed to the pool via Route2. As the user follows the navigation instructions, he walks straight into the middle of the food court. In his inebriated state, the food court smells amazing, and he immediately forgets he ever wanted to go to the pool, and orders a large pizza.

Figure 3:
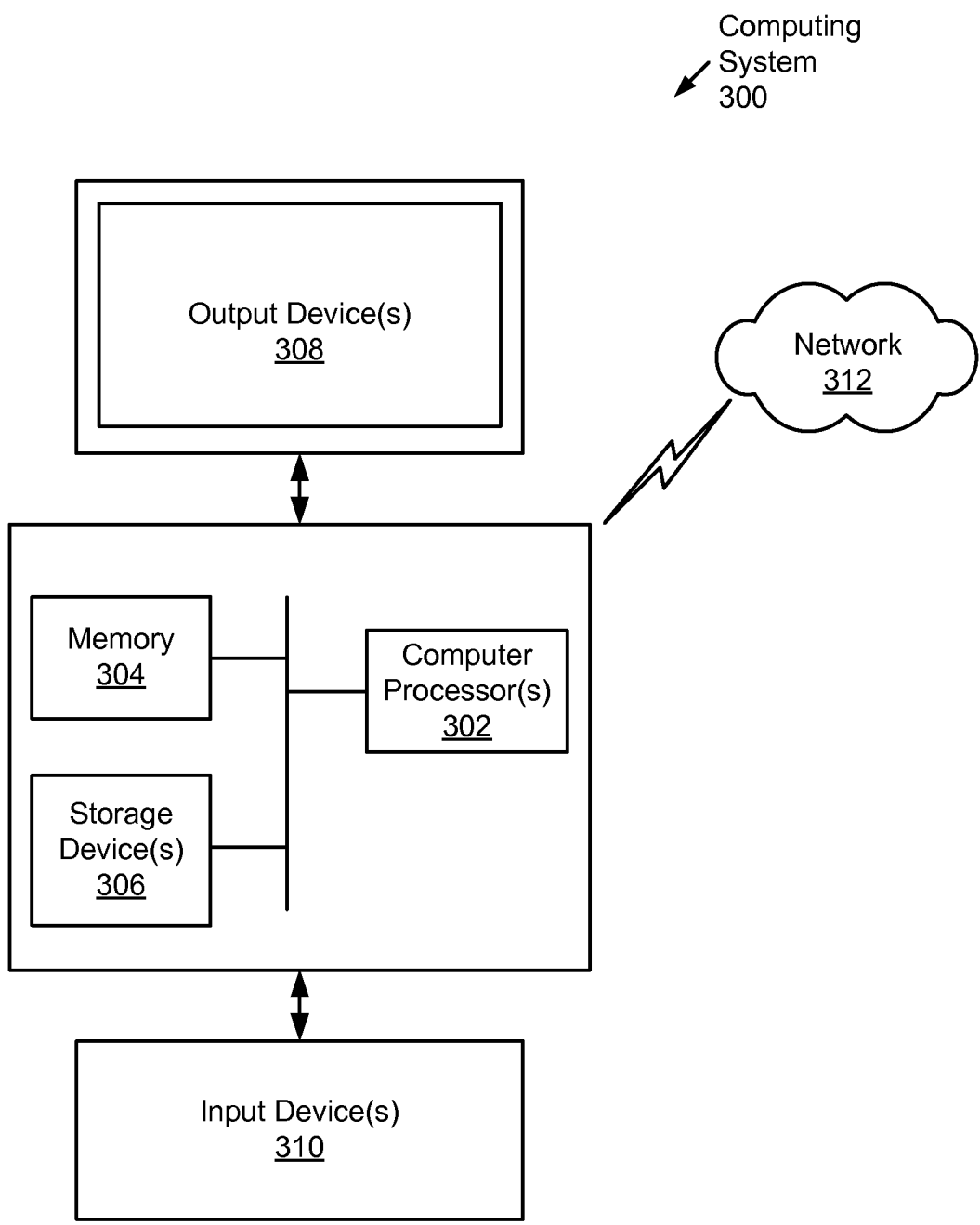
FIG. 3 shows a computer system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 3, the computing system (300) may include one or more computer processor(s) (302), associated memory (304) (e.g., random access memory (RAM), cache memory, flash memory, etc.), one or more storage device(s) (306) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (e.g., a local area network (LAN), a wide area network (WAN) such as the Internet, mobile network, or any other type of network) via a network interface connection (not shown). The input and output device(s) may be locally or remotely (e.g., via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (300) may be located at a remote location and connected to the other elements over a network (312). Further, embodiments may be implemented on a distributed system having a plurality of nodes, where each portion of the embodiments may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory machine-readable medium storing instructions executable by a processor of a client device to cause the client device to:
   receive a request from a user for directions to a specific destination;

obtain a plurality of routes from a current location of the user to the specific destination;
determine, based on historical user data, a commercial interest of the user;
rank the plurality of routes to the specific destination based on businesses that provide the commercial interest along the plurality of routes to the specific destination and based on purchase history of the user of the commercial interest;
select a route from the plurality of routes;
direct the user to the destination via the route;
determine whether the user is interested in purchasing a different commercial interest of the user based on the user pausing in a vicinity of a store that provides the different commercial interest; and
modify the route to route the user past stores that provide the different commercial interest.

2. The non-transitory computer readable medium of claim 1, wherein to rank the plurality of routes, the one or more processors are to:
identify a first route and a second route of travel as candidates for directing the user to the destination, wherein the second route does not pass by a location that provides the commercial interest; and
rank the first route and the second route based at least on whether the location that provides the commercial interest is on the first route and the second route.

3. The non-transitory computer readable medium of claim 1, wherein the instructions further cause the one or more processors to:
determine, in real-time during travel over the highest ranked route, a second type of commercial interest of the user; and
modify the highest ranked route for travel to the destination based on a location that provides the second type of commercial interest.

4. The non-transitory computer readable medium of claim 3, wherein the second type of commercial interest is different from the commercial interest that is used in the ranking of the plurality of routes.

5. The non-transitory computer readable medium of claim 1, wherein the commercial interest is determined at least in part by either a time of year or a time of day.

6. The non-transitory computer readable medium of claim 1, wherein the historical user data comprises purchase data of the user.

7. The non-transitory computer readable medium of claim 1, wherein the historical user data comprises an amount of time spent in a store by the user.

8. The non-transitory computer readable medium of claim 1, wherein the historical user data comprises a response to a questionnaire by the user.

9. The non-transitory computer readable medium of claim 1, wherein the user is located in a shopping mall, and the destination is a business within the shopping mall.

10. The non-transitory computer readable medium of claim 1, wherein the historical user data is gathered by a network device using WiFi.

11. A system comprising:
an input device;
an output device;
a hardware processor; and
a memory storing instructions executable by the hardware processor to:
receive a request from a user for directions to a specific destination responsive to receipt of an input at the input device;
obtain a plurality of routes from a current location of the user to the specific destination;
determine, based on historical user data, a commercial interest of the user;
rank the plurality of routes to the specific destination based on businesses that provide the commercial interest along the plurality of routes to the specific destination and based on purchase history of the user of the commercial interest;
select a route from the plurality of routes;
direct the user to the destination via the route via directions displayed on the output device;
determine whether the user is interested in purchasing a different commercial interest based on the user pausing in a vicinity of a store that provides the different commercial interest; and
modify the route to route the user past stores that provide the different commercial interest.

12. The system of claim 11, wherein to rank the plurality of routes, the instructions are to cause the hardware processor to:
identify a first route and a second route of travel as candidates for directing the user to the destination, wherein the second route does not pass by a location that provides the commercial interest; and
rank the first route and the second route based at least on whether the location that provides the commercial interest is on the first route and the second route.

13. The system of claim 11, wherein the instructions are further to cause the hardware processor to:
determine, in real-time during travel over the highest ranked route, a second type of commercial interest of the user; and
modify the highest ranked route for travel to the destination based on a location that provides the second type of commercial interest.

14. The system of claim 11, wherein the commercial interest is determined at least in part by a time of day or a time of year.

15. The system of claim 11, wherein the historical user data comprises purchase data of the user.

16. The system of claim 11, wherein the historical user data comprises an amount of time spent in a store by the user.

17. The system of claim 11, wherein the second type of commercial interest is different from the commercial interest that is used in the ranking of the plurality of routes.

18. The system of claim 11, wherein the user is located in a shopping mall, and the destination is a business within the shopping mall.

19. The system of claim 11, wherein the historical user data is gathered by a network device using WiFi.

20. A method comprising:
receiving, by a network device comprising a processor to control operation of the network device, a request from a user for directions to a specific destination;
obtaining a plurality of routes from a current location of the user to the specific destination;
determining by the network device, based on historical user data, a commercial interest of the user;
ranking, by the network device, the plurality of routes to the specific destination based on businesses that provide the commercial interest along the plurality of routes to the specific destination and based on purchase history of the user of the commercial interest;
selecting a route from the plurality of routes;

directing the user to the destination via the highest ranked route by the network device;

determining whether a user is interested in purchasing a different commercial interest based on the user pausing in a vicinity of a store that provides the different commercial interest; and modifying the route to route the user past stores that provide the second commercial interest.

\* \* \* \* \*